United States Patent
Burstrom et al.

(10) Patent No.: US 9,308,875 B2
(45) Date of Patent: Apr. 12, 2016

(54) WEAR RESISTANT LINING ELEMENT FOR EDGE PROTECTION AND METHOD FOR MANUFACTURING THE SAME

(71) Applicant: Metso Minerals (Sweden) AB, Trelleborg (SE)

(72) Inventors: Anders Burstrom, Limhamn (SE); Jonas Hansson, Furulund (SE); Henrik Persson, Trelleborg (SE)

(73) Assignee: Metso Minerals (Sweden) AB, Trelleborg (SE)

( * ) Notice: Subject to any disclaimer, the term of this patent is extended or adjusted under 35 U.S.C. 154(b) by 0 days.

(21) Appl. No.: 14/366,150

(22) PCT Filed: Dec. 17, 2012

(86) PCT No.: PCT/EP2012/075782
§ 371 (c)(1),
(2) Date: Jun. 17, 2014

(87) PCT Pub. No.: WO2013/092483
PCT Pub. Date: Jun. 27, 2013

(65) Prior Publication Data
US 2014/0354004 A1    Dec. 4, 2014

(30) Foreign Application Priority Data

Dec. 23, 2011   (EP) .................................... 11195657

(51) Int. Cl.
*B60R 13/01*    (2006.01)
*B29C 45/14*    (2006.01)
(Continued)

(52) U.S. Cl.
CPC ........... *B60R 13/01* (2013.01); *B29C 45/14008* (2013.01); *B29C 45/14311* (2013.01);
(Continued)

(58) Field of Classification Search
CPC ........................... B60R 13/01; B60R 2013/15
USPC .................................... 296/39.1, 39.2, 183, 2
See application file for complete search history.

(56) References Cited

U.S. PATENT DOCUMENTS 3,607,607 A * 9/1971 Beninga et al. ................. 428/49
3,652,123 A   3/1972 Speers
(Continued)

FOREIGN PATENT DOCUMENTS

| GB | 1197956 | * | 7/1970 |
| WO | 99/22957 A1 | | 5/1999 |
| WO | 2007/105038 A2 | | 9/2007 |

OTHER PUBLICATIONS

PCT Search Report dated Feb. 15, 2013.
(Continued)

*Primary Examiner* — Dennis H Pedder
(74) *Attorney, Agent, or Firm* — Andrus Intellectual Property Law, LLP

(57) ABSTRACT

A wear-resistant lining element which is intended for a surface subjected to wear and which has an outwardly directed surface, over which material in the form of pieces or particles, such as crushed ore and crushed rock material, is intended to move. The wear-resistant lining element includes an elastomeric material, and is characterized in that it has a metal profile at least partly embedded along an edge of the wear-resistant lining element by vulcanization or hardening. The disclosure also relates to a wear-resistant lining, a truck haul body and a method for manufacturing a wear-resistant lining element.

18 Claims, 5 Drawing Sheets

(51) Int. Cl.
    *B60P 1/28*   (2006.01)
    *B29L 31/30*   (2006.01)
(52) U.S. Cl.
    CPC ....... *B60P1/286* (2013.01); *B29C 2045/14327* (2013.01); *B29C 2045/14868* (2013.01); *B29L 2031/3005* (2013.01); *B60R 2013/015* (2013.01)

(56) References Cited

U.S. PATENT DOCUMENTS

| | | | |
|---|---|---|---|
| 3,717,969 A * | 2/1973 | Sequaris | 52/396.05 |
| 3,942,239 A | 3/1976 | Johansson | |
| 3,953,950 A * | 5/1976 | Sudyk | 52/127.12 |
| 4,029,354 A | 6/1977 | Valeri | |
| 4,855,174 A * | 8/1989 | Kawamoto | 428/67 |
| 5,185,980 A * | 2/1993 | Rydberg et al. | 52/506.09 |
| 2009/0015028 A1 | 1/2009 | Zamorano Jones | |
| 2011/0181067 A1* | 7/2011 | Dunn et al. | 296/39.2 |

OTHER PUBLICATIONS

European Search Report dated May 30, 2012.

\* cited by examiner

WEAR RESISTANT LINING ELEMENT FOR EDGE PROTECTION AND METHOD FOR MANUFACTURING THE SAME

CROSS-REFERENCE TO RELATED APPLICATIONS

This application claims priority to PCT/EP2012/075782, filed Dec. 17, 2012, and published in English on Jun. 27, 2013 as publication number WO 2013/092483, which claims priority to EP Application No. 11195657.9, filed Dec. 23, 2011, incorporated herein by reference.

TECHNICAL FIELD

The invention relates to a wear-resistant lining element which is intended for a surface subjected to wear. The invention also relates to a wear-resistant lining, a truck haul body and a method for manufacturing a wear-resistant lining element.

BACKGROUND ART

Wear-resistant linings are known and used both in chutes and on truck platforms for protecting the base. They usually consist of natural or synthetic rubber and are to protect from hard impacts by rocks and wear exerted by material moving over and in contact with the surface of the wear-resistant lining element. Relatively soft rubber materials provide good resistance to wear, but to prevent hard impacts from breaking through the wear-resistant lining element, this must be given a large thickness. Harder rubber materials provide better protection from impacts, but are more susceptible to abrasive wear. Therefore, wear-resistant lining elements have been developed, in which different materials are combined in the outwardly directed surface of the element, over which surface material in the form of pieces or particles, such as crushed ore and crushed rock material, is intended to move.

A problem when using such wear-resistant lining elements in order to protect a surface from wear, such as a surface on a truck haul body, is that material tends to find its way in under the wear-resistant lining element by travelling in between an edge of the wear-resistant lining element and the surface said edge is to bear against. This is a problem since the material gradually will loosen the wear-resistant lining element from the surface to which it is attached such that the wear-resistant lining element eventually will fall off. Additionally, the truck will carry around unwanted weight, leading to higher fuel consumption and in turn higher costs than necessary. Another problem is related to protecting the upper unprotected outer edge of the wear-resistant lining element from extensive wear as the corner exposed to the abrasive material will wear down/tear off and weaken the upper portion of the wear-resistant lining element.

Conventionally, this problem has been solved by adding a piece of metal along the edge of the wear-resistant lining element intended to cover any potential distance between said edge of the wear-resistant lining element and the surface said edge is to bear against when the wear-resistant lining element is attached. In case of a truck haul body, the piece of metal is provided between said edge of the wear-resistant lining element and a side wall of the truck haul body, for example, by means of welding and bolting.

There are, however, problems associated with the above mentioned solution. The installation of the extra metal part makes the installation process extensive and time consuming which in turn makes it expensive.

SUMMARY OF THE INVENTION

It is an object of the present invention to provide an improvement of the above technique and prior art. More particularly, it is an object of the present invention to provide an improved wear-resistant lining element reducing the installation time of the same and the other necessary details to a surface to be protected from wear. Further, it is an object of the present invention to provide a wear-resistant lining, a truck haul body and a method for manufacturing a wear-resistant lining element.

These and other objects as well as advantages that will be apparent from the following description of the present invention are achieved by a wear-resistant lining element which is intended for a surface subjected to wear according to the independent claim.

A wear-resistant lining element which is intended for a surface subjected to wear is provided. The wear-resistant lining element has an outwardly directed surface, over which material in the form of pieces or particles, such as crushed ore and crushed rock material, is intended to move. The wear-resistant lining element comprises elastomeric material and is characterized in that it has a metal profile at least partly embedded along an edge of the wear-resistant lining element by vulcanization or hardening. This is advantageous in that, since the metal profile is embedded in the wear-resistant lining, the installation of the now integrally formed details will be facilitated. For several of the wear-resistant lining elements that are to be attached to a surface subjected to wear, the number of details to install is decreased from two to one. Naturally, since the details to be installed are minimized, the installation time will be decreased and the overall costs reduced.

The metal profile may be weldable, which is advantageous in that it may be welded against a surface for secure attachment to the same. Preferably, the metal profile is made from steel.

The metal profile may have an L-shape, T-shape or V-shape, which are preferred embodiments of the metal profile.

The metal profile may be completely embedded along the edge of the wear-resistant lining element, which provides an exceptional fixation between the metal profile and the wear-resistant lining element.

The wear-resistant lining element may be made from preferably rubber or polyurethane. This is a preferred embodiment of the present invention which gives the wear-resistant lining desirable wear properties.

The wear-resistant lining element may comprise a plurality of neighbouring wear-resistant members mainly adapted to resist wear, which is advantageous in that the wear-resistant lining element may be used as a module system. Thus, the wear-resistant lining element will be easier to mount to the truck haul body. Additionally, single wear-resistant members may be exchanged when they are worn down without having to exchange the entire wear-resistant lining element.

According to a second aspect of the invention, the invention relates to a wear-resistant lining comprising at least one wear-resistant lining element according to the above described features.

According to a third aspect of the invention, the invention relates to a truck haul body of metal material lined with at least one wear-resistant lining according to the above described features.

According to a fourth aspect of the invention, the invention relates to a method for manufacturing a wear-resistant lining element. The method comprises arranging a metal profile in a mould, at an optional point of time after arranging the metal profile, supplying elastomeric material to the mould, and vulcanizing or hardening the elastomeric material, such that the metal profile is embedded along an edge of the wear-resistant lining.

The method may further comprise, before the step of arranging a metal profile in a mould, coating the metal profile with an adhesive solution. This is advantageous in that the metal profile will adhere better to the elastomeric material of the wear-resistant lining element.

The method may further comprise, before the step of arranging a metal profile in a mould, providing the metal profile with at least one cavity, such as a hole, for facilitating mechanical locking of said metal profile 6. This way, the elastomeric material will fill the holes of the metal profile when supplied to the mould for better attachment of the metal profile to the wear-resistant lining element.

Generally, all terms used in the claims are to be interpreted according to their ordinary meaning in the technical field, unless explicitly defined otherwise herein. All references to "a/an/the [element, device, component, means, etc]" are to be interpreted openly as referring to at least one instance of said element, device, component, means, etc., unless explicitly stated otherwise. Further, by the term "comprising" it is meant "comprising but not limited to" throughout the application.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein.

DETAILED DESCRIPTION OF PREFERRED EMBODIMENTS OF THE INVENTION

Figure 1A:
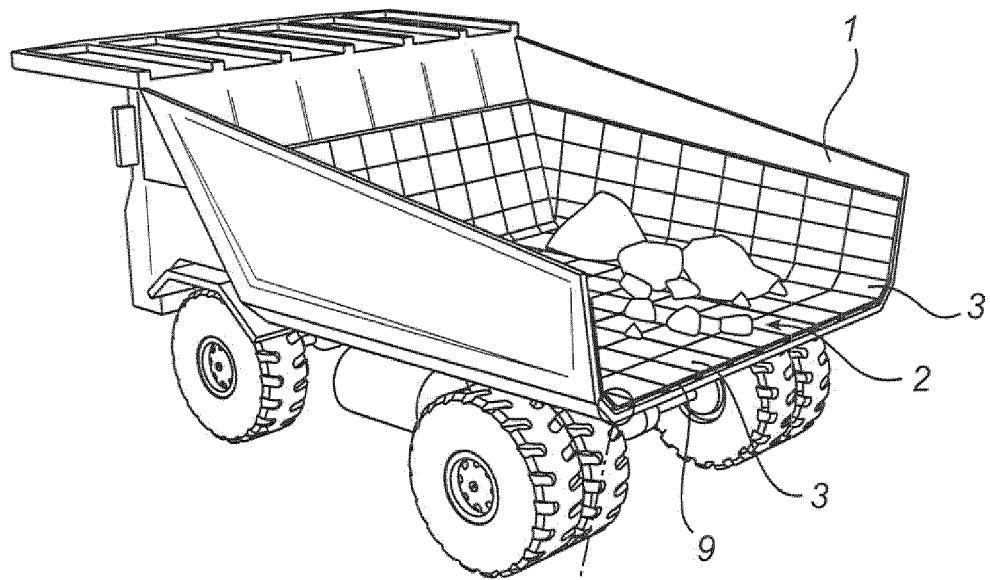
FIG. 1a is a perspective view of a truck haul body having a wear-resistant lining comprising a plurality of wear-resistant lining elements.

FIG. 1a illustrates a truck haul body 1 of metal material comprising a wear-resistant lining 2. The wear-resistant lining 2 is constituted by a plurality of wear-resistant lining elements 3. The wear-resistant elements 3 are provided along the base surface 4 of the truck haul body 1.

Figure 1B:
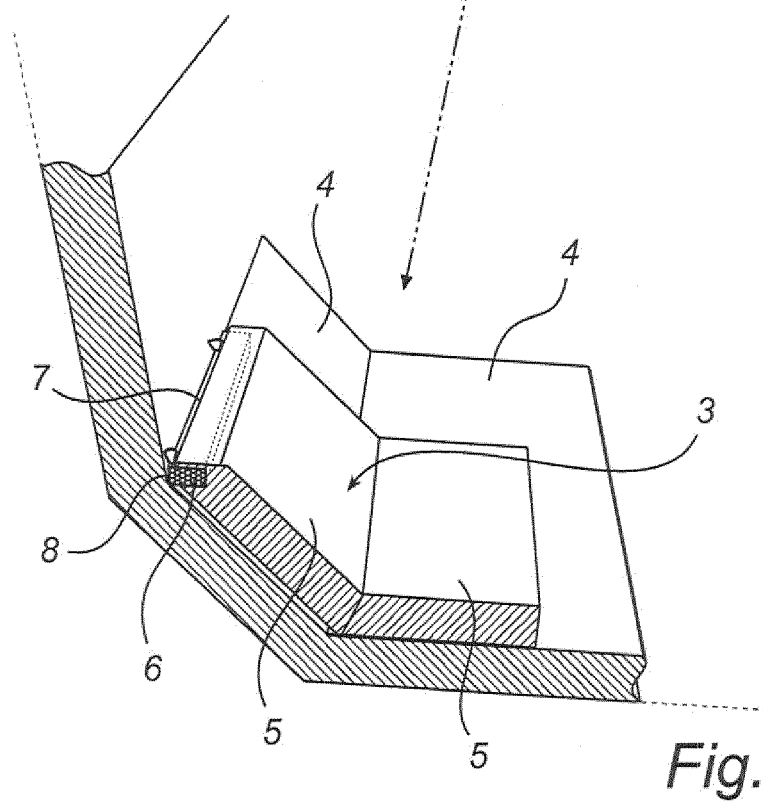
FIG. 1b is a perspective view of a wear-resistant lining element according to a first exemplary embodiment of the invention.

In FIG. 1b, a wear-resistant lining element 3 according to a first exemplary embodiment of the invention is illustrated. The wear-resistant lining element 3 is intended for the surface 4 of the truck haul body 1 which is subjected to wear. The wear-resistant lining element 3 has an outwardly directed surface 5, over which material in the form of pieces or particles, such as crushed ore and crushed rock material, moves or impacts. The wear-resistant lining element 3 comprises elastomeric material and is preferably made from rubber or polyurethane. The wear-resistant lining element 3 has a metal profile 6 partly embedded along an edge 7 of the wear-resistant lining element 3 by means of vulcanization or hardening. When the wear-resistant lining element 3 is made from rubber, vulcanization is used to embed the metal profile 6. When the wear-resistant lining element 3 is made from polyurethane, hardening is used to embed the metal profile 6. The metal profile 6 is exposed along one edge 8 in order to be weldable to a side wall of the truck haul body 1. Besides the exposed edge 8 of the metal profile 6, said metal profile 6 is completely embedded in the wear-resistant lining element 3. The metal profile 6 is preferably made from steel. Since the metal profile 6 is fixed to the wear-resistant lining element 3 by means of vulcanizing or hardening and in turn welded to the side wall of the truck haul body 1, the material loaded in the truck haul body 1 has no possibility to find its way in under the wear-resistant lining element 3 by falling between the edge 7 of the same and the surface 4 said edge 7 bear against. Thus, the problem of material, which has been caught between the wear-resistant lining element 3 and the surface 4 of the truck haul body 1, gradually loosening the wear-resistant lining element 3 from the surface 4, to which it is attached, is eliminated.

Figure 2A:
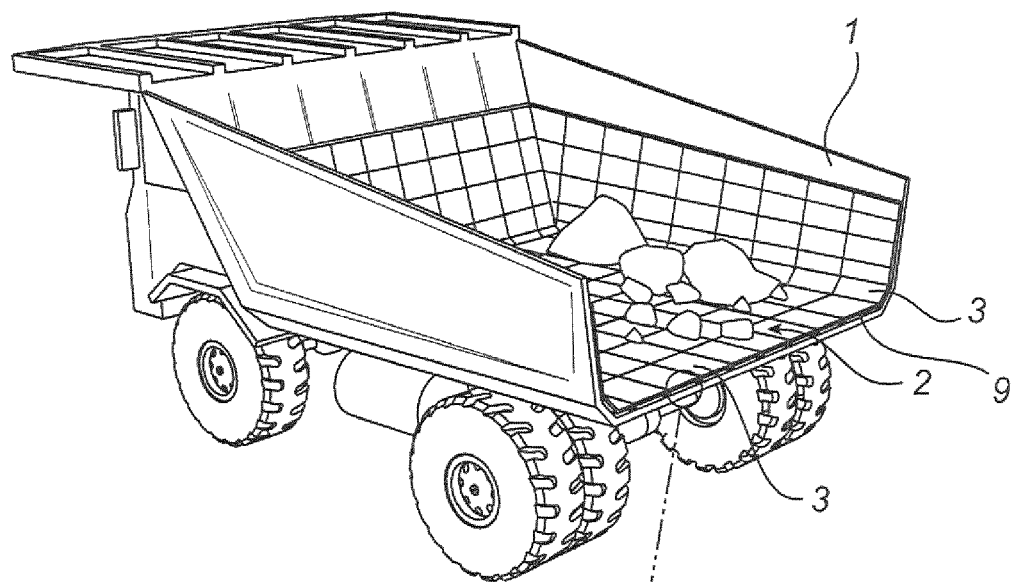
FIG. 2a is a perspective view of the truck haul body having a wear-resistant lining comprising a plurality of wear-resistant lining elements.

FIG. 2a illustrates the truck haul body 1 of metal material comprising a wear-resistant lining 2. The wear-resistant lining 2 is constituted by a plurality of wear-resistant lining elements 3. The wear-resistant elements 3 are provided along the base surface 4 of the truck haul body 1.

Figure 2B:
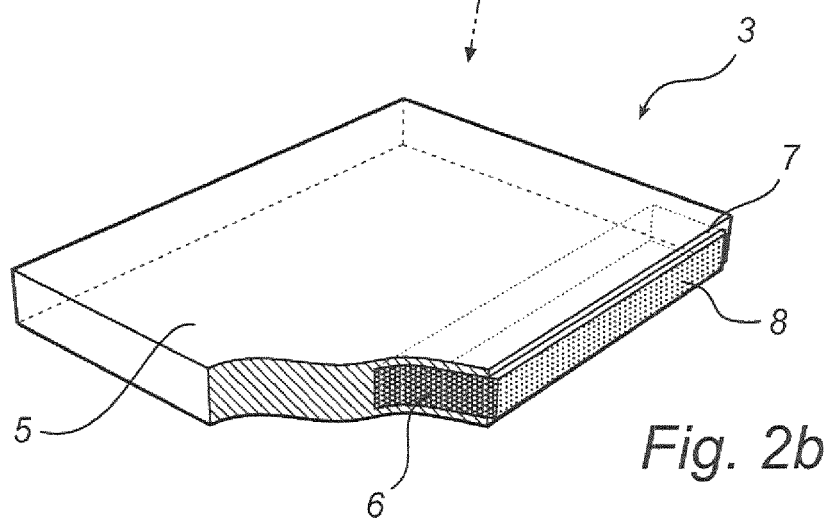
FIG. 2b is a perspective view of the wear-resistant lining element according to a second exemplary embodiment of the invention

In FIG. 2b, the wear-resistant lining element 3 according to a second exemplary embodiment of the invention is illustrated. The wear-resistant lining element 3, according to this embodiment, is intended for an end edge 9 of the surface 4 of the truck haul body 1. The wear-resistant lining element 3 has an outwardly directed surface 5, over which material in the form of pieces or particles, such as crushed ore and crushed rock material, moves or impacts. The wear-resistant lining element 3 comprises elastomeric material and is preferably made from rubber or polyurethane. The wear-resistant lining element 3 has a metal profile 6 partly embedded along an edge 7 of the wear-resistant lining element 3 by means of vulcanization or hardening. The metal profile 6 is exposed along one edge 8. Besides the exposed edge 8 of the metal profile 6, said metal profile 6 is completely embedded in the wear-resistant lining element 3. The metal profile 6 is preferably made from steel. During unloading of the truck haul body 1, material naturally moves over the surface 4 and when the end of the haul truck body 1 is reached, the material passes over the end edge 9 of the surface 4. Thus, the wear-resistant lining element 3, covering the end edge 9 of the surface 4, is heavily subjected to wear and in time the wear-resistant lining element 3 will risk to rise from the surface 4 as a consequence from said wear. Further in time, the entire wear-resistant lining element 3 will risk detaching from the surface 4 as a consequence from the wear. The metal profile 6 will keep the wear-resistant lining element 3 in place and function to prevent the wear-resistant lining element 3 from rising from the surface 4.

Figure 3:
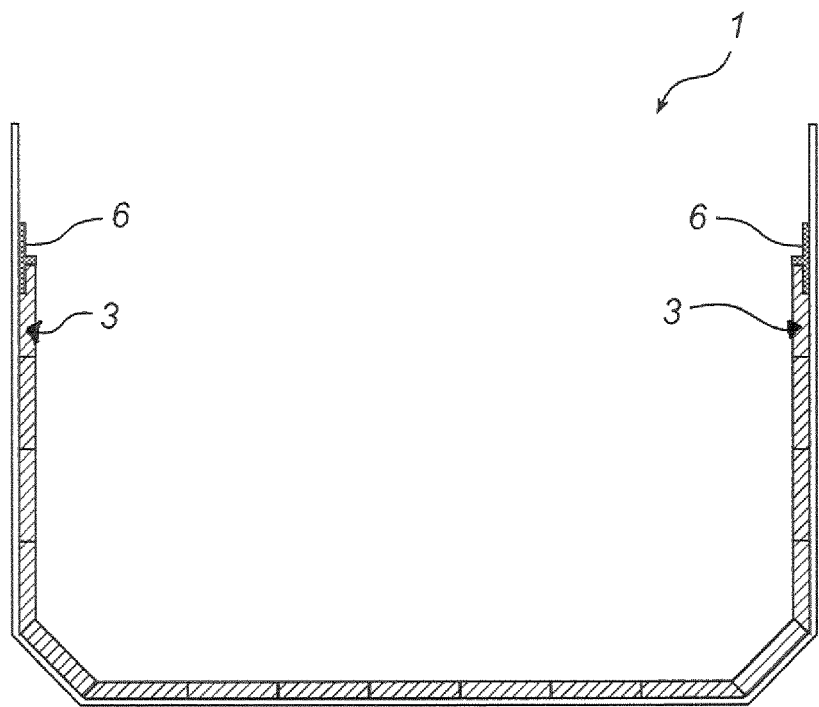
FIG. 3 is a schematic view of the truck haul body comprising a plurality of wear-resistant lining elements having T-shaped metal profiles.

FIG. 3 illustrates the truck haul body 1 comprising a plurality of wear-resistant lining elements 3 having T-shaped metal profiles 6. The T-shaped metal profile 6 is tilted 90 degrees such that its top can be attached to one of the side walls of the truck haul body 1 by means of, for example, welding, screwing or bolting. The base of the T-shaped metal profile 6 is used as protection for the elastomeric material of the wear-resistant lining element 3 and also prevents material from travelling in between the side wall of the truck haul body 1 and the wear-resistant lining element 3. The T-shaped metal profile 6 may be reinforced by adding a triangular metal detail between the top and the bottom of the T-shaped metal profile on either one of its sides.

Figure 4:
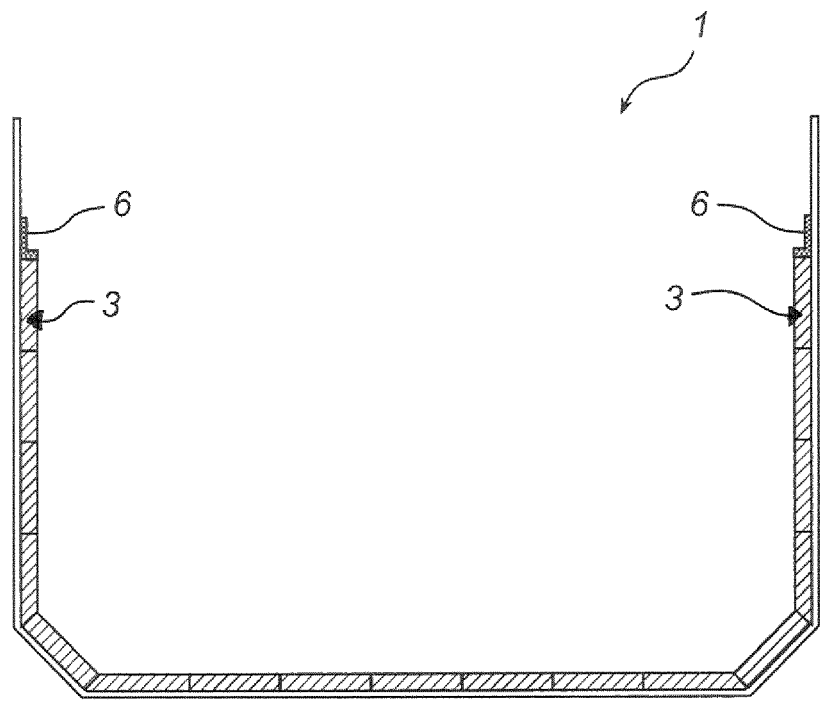
FIG. 4 is a schematic view of the truck haul body comprising a plurality of wear-resistant lining elements having L-shaped metal profiles.

In FIG. 4, the truck haul body 1 comprising a plurality of wear-resistant lining elements 3 having L-shaped metal profiles 6 is illustrated. One leg of the L-shaped metal profile 6 is attached to one of the side wall of the truck haul body 1 by means of, for example, welding, screwing or bolting. The other leg of the L-shaped metal profile 6 is used as protection for the elastomeric material of the wear-resistant lining element 3 and also prevents material from travelling in between the side wall of the truck haul body 1 and the wear-resistant lining element 3. The L-shaped metal profile 6 may be reinforced by adding a metal detail of, for example, triangular shape between the two legs of the L-shaped metal profile 6.

Figure 5:
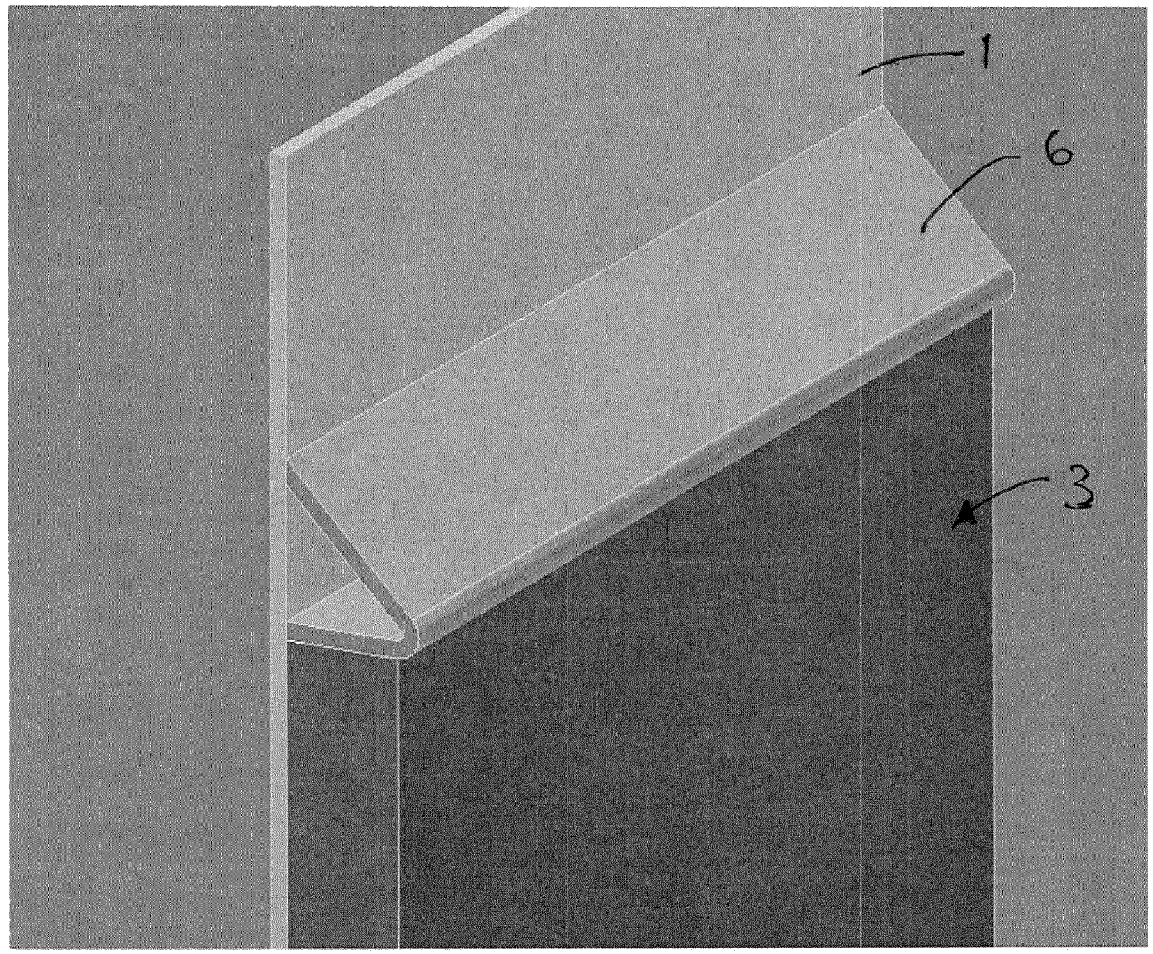
FIGS. 5 and 6 are perspective views of the wear-resistant lining element having a V-shaped metal profile.
Figure 6:
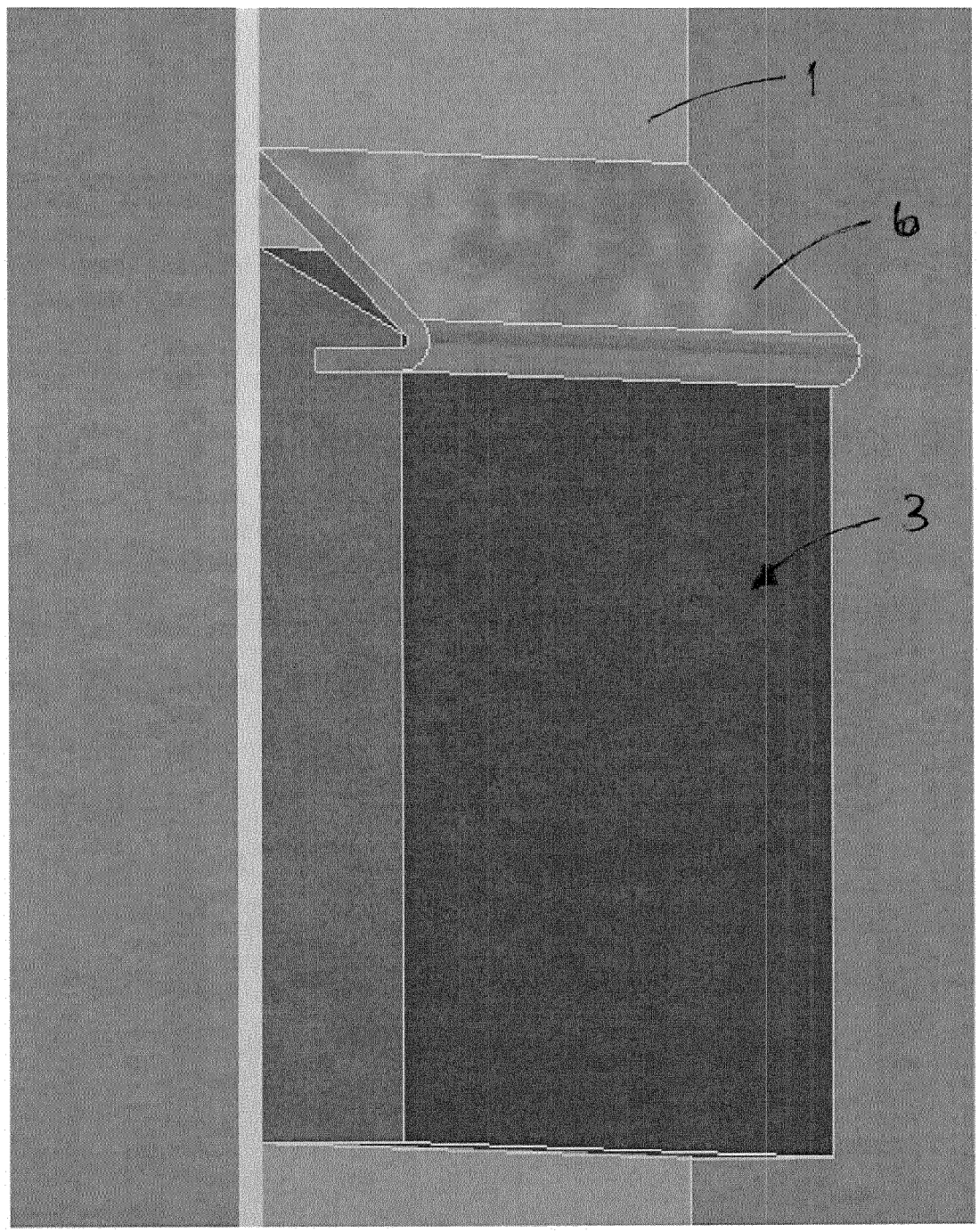

FIGS. 5 and 6 illustrate the wear-resistant lining element 3 having a V-shaped metal profile 6. The V-shaped metal profile 6 is tilted 90 degrees such that the top of one or both of its two legs can be attached to one of the side walls of the truck haul body 1 by means of, for example, welding, screwing or bolting. The V-shaped metal profile 6 may be reinforced by adding a metal detail of, for example, triangular shape between the two legs of the V-shaped metal profile 6.

The metal profile 6 may also be completely embedded in the wear-resistant lining element 3.

The metal profile 6 of the wear-resistant lining element 3 may be attached to the truck haul body 1 in any suitable way, for example by welding, screwing or bolting.

Material with high wear-resistance, such as ceramics, may be embedded in the wear-resistant lining element 3 in order to protect against wear.

The invention has mainly been described above with reference to a few embodiments. However, as is readily appreciated by a person skilled in the art, other embodiments than the ones disclosed above are equally possible within the scope of the invention, as defined by the appended claims.

The invention claimed is:

1. A wear-resistant lining element which is intended for a surface subjected to wear and which has an outwardly directed surface, over which material in the form of pieces or particles, such as crushed ore and crushed rock material, is intended to move, said metal profile comprising elastomeric material, wherein said wear resistant lining element has a metal profile at least partly embedded along an outer edge of said wear-resistant lining element by vulcanization or hardening,
    wherein an edge of said metal profile is exposed along the entire outer edge of said wear-resistant lining element such that the edge of the metal profile is weldable to said surface subjected to wear;
    wherein said wear-resistant lining element prevents material from traveling in between said outer edge of said wear-resistant lining element and said surface subjected to wear and protects the entire outer edge of said wear-resistant lining element from impact and wear.

2. A Wear-resistant lining element according to claim 1, wherein said metal profile is made from steel.

3. A wear-resistant lining element according to claim 1, wherein said metal profile has an L-shape.

4. A wear-resistant lining element according to claim 1, wherein said metal profile has a T-shape.

5. A wear-resistant lining, element according to claim 1, wherein said metal profile has a V-shape.

6. A wear-resistant lining element according to claim 1, wherein said metal profile is completely embedded along said outer edge of said wear-resistant lining element.

7. A wear-resistant lining element according to claim 1, wherein said wear-resistant lining element is made from rubber.

8. A wear-resistant lining element according to claim 1, wherein said wear-resistant lining element is made from polyurethane.

9. A wear-resistant lining, element according to claim 1, wherein said wear-resistant lining element comprises a plurality of neighboring wear-resistant members adapted to resist wear.

10. A wear-resistant lining of elastomeric material comprising a plurality of wear-resistant lining elements as claimed in claim 1.

11. A truck haul body of metal material lined with the wear-resistant lining as claimed in claim 10, wherein said wear-resistant lining is attached to a side wall of said truck haul body in order to prevent material from traveling in between said side wall and said wear-resistant lining and to protect an entire outer edge of said wear-resistant lining element from impact and wear.

12. A method for manufacturing a wear-resistant lining element, comprising
    arranging a metal profile in a mold,
    at a point of time after arranging the metal profile, supplying elastomeric material to said mold,
    vulcanizing or hardening, said elastomeric material, such that the metal profile is embedded along an outer edge of said wear-resistant lining element, and
    exposing said metal profile along the entire edge of the wear-resistant lining element so that the wear-resistant lining element is weldable to a surface being subjected to wear in order to prevent material from traveling in between said outer edge of said wear-resistant lining element and said surface subjected to wear, and to protect the entire outer edge of said wear-resistant lining element from impact and wear.

13. The method according to claim 12, further comprising, before the step of arranging, a metal profile in the mold, coating the metal profile with an adhesive solution.

14. The method according to claim 12, further comprising, before the step of arranging a metal profile in the mold, providing the metal profile with at least one cavity for facilitating mechanical locking of said metal profile.

15. A truck haul body of metal material lined with at least one wear-resistant lining element over which material in the form of pieces or particles, such as crushed ore and crushed rock material is intended to move, said wear-resistant lining element comprising:
    elastomeric material and a metal profile, wherein a first portion of said metal profile is both at least partially embedded and attached to said wear-resistant lining element by vulcanization or hardening; and
    a second portion of said metal profile is attached to a side wall of said truck haul body in order to prevent material from traveling in between said side wall and said wear-resistant lining element and to protect an entire outer edge of said wear-resistant lining element from impact and wear.

16. The truck haul body of claim 15 wherein the metal profile has an L-shape.

17. The truck haul body of claim 15 wherein the metal profile has a T-shape.

18. The truck haul body of claim 15 wherein the metal profile has a V-shape.

* * * * *